C. H. KNELL.

ANTICREEPING DEVICE FOR RAILWAY RAILS.

APPLICATION FILED SEPT. 7, 1922.

Reissued Oct. 17, 1922. 15,470.

INVENTOR

Charles H. Knell, by Byrne, Sawin & Parmele, his atty.

Reissued Oct. 17, 1922.

Re. 15,470

UNITED STATES PATENT OFFICE.

CHARLES H. KNELL, OF VERONA, PENNSYLVANIA, ASSIGNOR TO VERONA TOOL WORKS, OF VERONA, PENNSYLVANIA, A CORPORATION OF PENNSYLVANIA.

ANTICREEPING DEVICE FOR RAILWAY RAILS.

Original No. 1,416,474, dated May 16, 1922, Serial No. 491,887, filed August 13, 1921. Application for reissue filed September 7, 1922. Serial No. 586,743.

*To all whom it may concern:*

Be it known that I, CHARLES H. KNELL, a citizen of the United States, residing at Verona, in the county of Allegheny and State of Pennsylvania, have invented a new and useful Improvement in Anticreeping Devices for Railway Rails, of which the following is a full, clear, and exact description.

The present invention relates broadly to rail fastenings or rail anchors, and more particularly to an anti-creeping fastening for preventing longitudinal movement of the rails.

By the employment of my invention, an anti-creeper is provided which consists of a piece of metal having one end thereof shaped to engage the rail base, and the other end portion shaped to form a vertically extending key-receiving opening, a part of said opening being opposite the rail flange. In applying the anti-creeper to a rail, a key is driven down into the key-receiving opening and engages the edge of the rail flange.

My invention will be better understood by reference to the accompanying specification and drawings forming a part thereof, it being premised that changes may be made in the various details and the manner of operation within the scope of the appended claims, without departing from the spirit of the invention.

Figure 1:
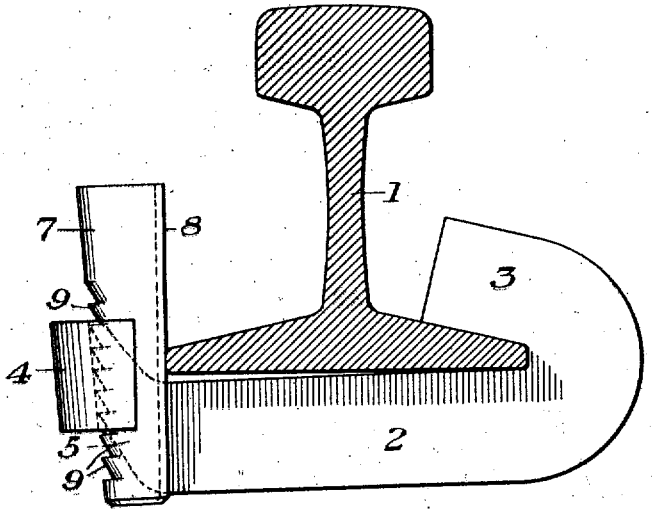
Figure 1 illustrates a rail section having an anti-creeper applied thereto.
Figure 2:
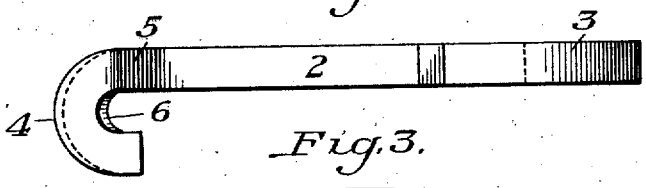
Figure 2 is an edge view of the anti-creeper itself with the key removed therefrom.
Figure 3:
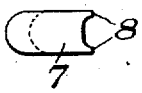
Figure 3 is an end view of the key.
Figure 4:
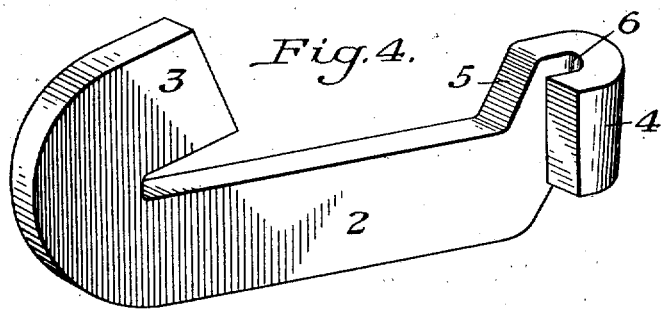
Figure 4 is a perspective view of the main body of the anti-creeper.

Referring more particularly to the drawings, there is illustrated in Figure 1 a section of a standard rail 1 having an anti-creeper constructed in accordance with the present invention applied thereto. This anti-creeper preferably comprises a main body portion 2 formed from a relatively flat imperforate bear of suitable metal. Adjacent one end of the main body portion the bar is bent edgewise upon itself to form a loop 3 adapted to overlie one edge of the base flange of the rail when the anti-creeper is in position thereon with the main body portion 2 extending transversely below the same. Adjacent its opposite end, the bar is bent flatwise to form a loop 4 extending at substantially right angles to the loop 3. Intermediate the two loops 3 and 4 and adjacent the loop 4, the bar is provided with an upwardly extending bent portion 5, adapted to bring the loop 4 into such position that a portion of it will be opposite the base flange of the rail when the anti-creeper is applied thereto.

The loop 4 is preferably so formed as to provide an inclined seat 6, adapted to co-operate with a tapered key 7, which is driven into position and extends at substantially right angles to the base flange of the rail and parallel to one of the flat faces of the body portion 2. This key forms the union between the anti-creeper and the rail at one side, and in order to effectively prevent creeping, it may be provided with spaced rail-gripping ribs 8. These ribs bite firmly into the base flange of the rail when the key is driven into position, and accidental loosening of the key under the vibrations imparted to the anti-creeper is prevented by forming the side thereof in engagement with the seat 6 with a plurality of teeth or serrations 9.

By reason of the upwardly extending bend 5, the loop 4, which may be termed the "key-receiving loop," is brought into such position that a bearing for the key 7 is provided in the plane of the base flange of the rail. This forms a rigid construction capable of withstanding the strain to which the device is subjected. The main body portion 2 forms a tie abutment extending throughout the major portion of the length of the anti-creeper and the relatively large area engaging the tie prevents, to a large extent, the objectionable cutting and breaking of the tie fibres.

By reason of the construction of the present anti-creeper from a single piece of metal, the opposite ends of which are bent to form a base flange-engaging loop and a key-receiving loop, respectively, there may be utilized an imperforate bar, thereby obviating the necessity of performing a punching operation thereon. In this manner, the manufacturing cost of the device is minimized and the strength of the bar is unimpaired. At the same time, by reason of the fact that the loop 4 does not engage the base flange of the rail, there is effected a considerable saving in material.

The advantages of the present invention arise from the ease of application of the anti-creeper and the possibility of reusing the same a number of times without the necessity of any repairs thereto.

Further advantages arise from the rigidity secured by reason of the location of the bearings for the key and base flange and the effective gripping action which is secured on the rail.

I claim:

1. An anti-creeper for rails, comprising a member adapted to extend underneath the rail base and having loops at its opposite ends, one of said loops extending at an angle to the other loop and having a vertically extending opening and a key adapted to be driven down within the opening and engage the edge of the rail flange.

2. An anti-creeper for rails, comprising a member adapted to extend underneath the rail base and having loops at its opposite ends, one of said loops extending at an angle to the other loop and having a portion directly opposite to the edge of the rail flange and forming a vertically extending opening and a key adapted to be driven in the opening and engage the edge of the rail flange.

3. An anti-creeper for rails, comprising a member adapted to extend underneath the rail base and having loops at its opposite ends, one of said loops extending at an angle to the other loop and having a portion directly opposite to the edge of the rail flange and forming a vertically extending opening, and a key adapted to engage both the loop and the edge of the rail flange.

4. An anti-creeper for rails, comprising a member adapted to extend underneath the rail base and having loops at its opposite ends, one of said loops extending at an angle to the other loop and having a vertically extending key-receiving opening opposite the rail base flange.

5. An anti-creeper for rails, comprising a member adapted to extend underneath the rail base and having one end bent upwardly to engage one rail base flange and having the other end bent upwardly and laterally to form a key socket opposite the other rail base flange.

6. An anti-creeper for rails, comprising a wrought metal bar adapted to pass under the base of the rail, said bar being bent adjacent one end thereof to form a loop for engagement with the base flange of the tail and bent adjacent the other end thereof to form a second loop at an angle to said first loop and opposite the edge of the rail flange, and a base flange-engaging key for said second loop.

7. An anti-creeper for rails, comprising a wrought metal bar having one end portion bent up to form a loop to engage the rail base and the other end portion bent sidewise to form a loop having a vertically extending opening therein, said loop also extending upwardly opposite to the edge of the rail base.

8. An anti-creeper for rails, comprising a relatively flat wrought metal bar adapted to pass under the base of a rail, said bar being bent edgewise adjacent one end thereof to form a loop for engagement with the base flange of a rail, a second loop adjacent the other end of said bar extending at an angle to said first loop, said bar being bent upwardly adjacent said second loop to bring a portion of the loop opposite the rail base flange when the anti-creeper is in position thereon.

9. An anti-creeper for rails, comprising a relatively flat wrought metal member adapted to pass under the base of a rail and having one end bent edgewise to engage the rail base and having a vertically extending key-receiving socket adjacent the opposite end of said member, said key-receiving socket being so positioned that a portion thereof lies opposite the rail base flange when the anti-creeper is in position on a rail and a key for said socket adapted to engage the edge of the rail base.

10. An anti-creeper for rails, comprising a relatively flat member adapted to pass edgewise under the base of a rail, a base flange-engaging portion adjacent one end of said member, a key-receiving portion adjacent the opposite end of said member, said member being bent upwardly adjacent said key-receiving portion to bring a part of said key-receiving portion opposite the base flange of the rail when the anti-creeper is applied thereto, and a key for said key-receiving portion, the portion of said member passing under the rail forming a tie-abutting portion intermediate said portions.

11. An anti-creeper for rails, comprising a wrought metal member having one end portion bent for engagement with a rail base and the other end portion bent to form a vertically extending key-receiving opening therein extending upwardly opposite the edge of the rail base and a key for said opening having teeth on one part for engagement with said member, and rail-gripping means on another part thereof for engagement with the rail base flange.

In testimony whereof, I have hereunto set my hand.

CHARLES H. KNELL.